April 11, 1961 H. E. METCALF 2,978,915
ROTARY ACTUATOR
Filed March 25, 1957

INVENTOR:
Hubert E. Metcalf

United States Patent Office 2,978,915
Patented Apr. 11, 1961

2,978,915

ROTARY ACTUATOR

Herbert E. Metcalf, P.O. Box 35, Malibu, Calif.; Carol R. Metcalf, administratrix of said Herbert E. Metcalf, deceased Filed Mar. 25, 1957, Ser. No. 648,139

8 Claims. (Cl. 74—89)

My invention relates to rotary actuators and particularly to such actuators as may be operated by the armature of an electrical solenoid assembly.

This invention is an improvement, to attain high stroke speed with high efficiency, in a solenoid actuator of the type disclosed in German Patent No. 659,975 effective as of May 18, 1935, and is also a continuation-in-part of my pending application serial No. 623,082, filed Nov. 19, 1956.

Among the objects of the present invention are:

To provide an improved solenoid operated rotary actuator capable of high stroke rates.

To provide a solenoid operated rotary actuator having low friction losses.

To provide a supple and efficient means of converting the axial motion of a solenoid armature into a combined axial and rotary motion.

To provide a solenoid operated rotary actuator substantially free from the effects of dust accumulation.

To provide a ball-and-slot bearing suitable for use in conjunction with a solenoid armature to impart a rotary motion component thereto.

And to provide a simple and efficient solenoid operated motion converter suitable for use in counters, switches, computers and the like.

In brief my invention comprises, in one form, a pair of relatively rotatable coaxial members one of which is preferably stationery, the other being free to move axially and to rotate. A plurality of pairs of opposed parallel-edged slots are provided in the two members, these slots having both a circular and axial extent. A ball is placed in each slot pair, coupling the two members and bearing only on the slot edges. Axial motion of the movable member will then cause rotation of the member due to slot direction and extent. The movable member may be the armature of an electrically operated solenoid or may be operatively connected to a solenoid core, for the production of the axial motion. As the balls bear only on the edges of the slots, friction is greatly reduced and torque per unit energy input is high.

My invention will be more fully understood by reference to the drawings in which.

Figure 1:
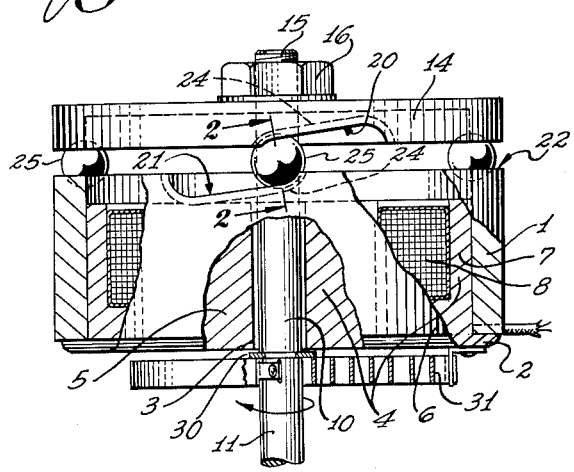
Figure 1 is a side view partly in section and partly in elevation of an embodiment of the invention in which the slots have the same radius.
Figure 2:
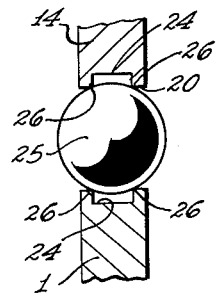
Figure 2 is a diagram showing ball and slot edge relationship in the device of Figure 1.

Referring first to the embodiment of the invention shown in Figures 1 and 2, a cylindrical casing 1 is provided with an end plate 2 having a central shaft aperture 3, the end plate 2 being peened or otherwise fastened at the edge thereof to casing 1.

A magnetic circuit 4 is positioned in the cup formed by casing 1 and end plate 2, this circuit having a central bored pole piece 5, a base 6 and a circumferential pole piece 7. The top surfaces of pole pieces 5 and 7 are preferably in the same plane. A solenoid winding 8 is positioned in the annular space between the two pole pieces 5 and 7.

An operating shaft 10 is positioned in the bore of central bored pole piece 5, passing through end plate 2 through central shaft aperture 3. The protruding end 11 of this shaft 10 can then be used for the power take-off of the actuator, as for example by being attached to a jaw clutch or the like. This shaft is free to rotate and to move axially in bore of central pole piece 5.

An armature disc 14 is attached to the other end 15 of shaft 10 as by the use of nut 16. Disc 14 is placed at the open end of cylindrical casing 1 in a position to be attracted to pole pieces 5 and 7 when solenoid winding 6 is energized.

Such energization would normally result only in axial movement of disc 14, and in order to provide an additional rotary motion, I couple disc 14 to the casing 1 in a novel manner, using a plurality of ball and slot assemblies, four as shown or preferably three. Only one of these assemblies will be described in detail, as they are all alike.

In each assembly, an axially slanted surface 20 is cut or milled into disc 14. This surface is not only slanted axially but has a predetermined circular and circumferential extent, following the curvature of the cylindrical casing 1. A reciprocal surface 21 is cut into the end surface 22 of the casing cylinder 1 so that in any relative position along the extent of the slots, the slant surfaces are parallel. Then, a slot 24, best shown in Figure 2, is milled into each slant surface 20 and 21. A ball 25 is then inserted between each pair of slots 20—21, this ball being of larger diameter than the width of the slots so that the ball bears only on the sharp edges 26 of the slots and does not touch the bottom of the slots.

Shaft 10 is held in the bore of the central pole piece by external snap ring 30, thereby preventing balls 25 from leaving their slots. The edges of the slots hold the balls in position.

Normally the armature is biassed away from pole pieces 5 and 7 by a spring 31 connecting the outside of end plate 2 with shaft 10. Balls 25 are then in the slots at the shallowest portions of the surfaces 20 and 21 as shown in Figure 1. When axial movement of the disc 14 is started by magnetic attraction from the solenoid, disc 14 rotates, the balls 25 rolling, again solely on the edges of the slots, to the end of their stroke, ending with the balls in the slots at the deepest portions of the surfaces 20 and 21. When the solenoid winding 8 is deenergized the spring 31 returns disc 14 to its original position. Thus for each electrical pulse in winding 8 the shaft 10 is rotated through an angle dependent upon the angular extent of the slots and is extended axially by the amount of the armature stroke.

As balls 25 roll only on the edges 26 of the slots 24 friction is low, dust does not accumulate on these edges and long, efficient life is assured. Furthermore, wear is reduced as each ball has four contacts with the slot edges thereby dividing the transmitted forces.

Figure 3:
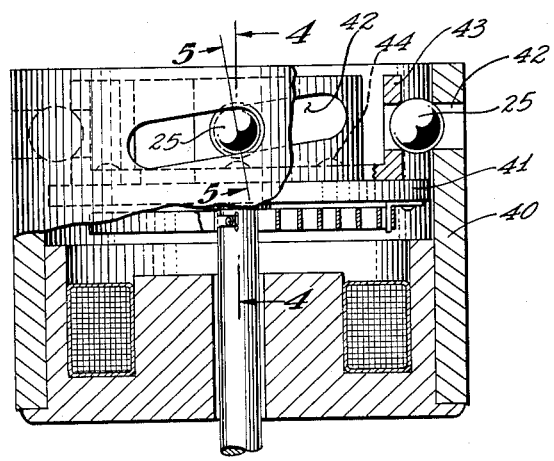
Figure 3 is a side view partly in section and partly in elevation of an embodiment of the invention in which the slots have different radii and are concentric.
Figure 5:
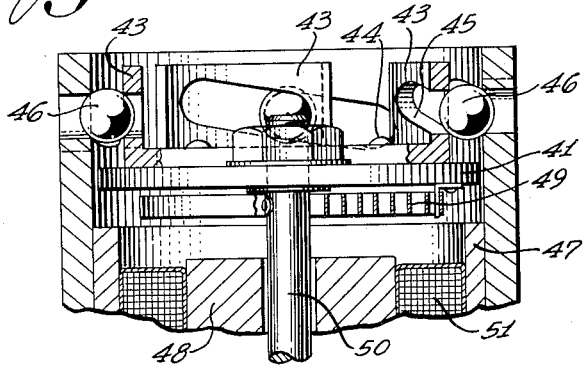
Figure 5 is a view in section showing one way in which balls may be installed in the device of Figure 3.
Figure 4:
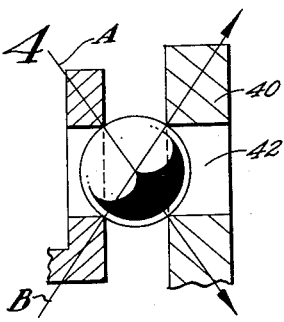
Figure 4 is a diagram showing the ball and slot edge relationship in the device of Figure 3.

Another embodiment of the invention is shown in Figures 3, 4, and 5 when the slots are side by side, instead of one above the other, as was illustrated in Figure 1.

In this embodiment, the casing 40 extends beyond armature disc 41 and has a plurality of arcuate cylinder slots 42 cut directly through the casing wall. Here again as all the ball and slot assemblies are the same, only one will be described in detail. Three are preferred, as shown.

For each ball and slot assembly, an upwardly extending cylindrical sector 43 is provided, attached to armature disc 41 as by screws 44 (see Figure 5). An arcuate sector slot 45 is cut into each sector 43 this slot 45 as well as the cylinder slot 42 having both an axial and circumferential extent, the two slots being identical, concentric, and opposed. A ball 46 can readily be inserted between the slot edges of each two opposed slots, as best shown in Figure 4, by loosening screws 44 in each sector, inserting the balls and then tightening screws 44 with the balls between the slots. The balls should of course be of greater diameter than the slots, but not so large as to prevent retention by the slot edges in the same manner as in the slots of the device of Figure 1.

Again, in this embodiment, armature disc 41 is normally held away from pole pieces 47 and 48 by a spring 49 connecting a shaft 50 and casing 1.

In this embodiment the balls are normally held in the low end of one slot and in the high end of the other. As disc 41 is drawn toward the pole pieces by energization of a solenoid winding 51 the disc 41 starts rotating as the balls travel along the slot edges, until the slot ends are reversed. At the end of the stroke, and after the solenoid 50 is deenergized, spring 49 returns disc 41 to its original position. Thus the result of operation of this latter embodiment is the same as that of the device of Figure 1, previously described.

The main difference between the two slot arrangements described is that in the one-above-the-other slot arrangement of Figure 1, the axial force of both solenoid and spring is transmitted through four ball-edge contacts simultaneously, whereas in the side-by-side slot arrangement of the device of Figure 3 the solenoid force is transmitted through diagonally separated edges along line A in Figure 4, and the return spring force is transmitted through the remaining diagonally opposed edges along the line B. In both embodiments, however, the forces are divided over four ball-edge contacts. It is also to be noted that in this embodiment the slots are in members that can be hardened without loss of flux efficiency.

It is to be noted that any arrangement applying an axial force to the movable member in either embodiment will create the rotary movement desired. Thus the actuator does not require that the movable member be a solenoid armature. A cam, hydraulic or pneumatic piston, or a solenoid plunger bearing axially on the movable member will serve to operate the actuator. It is also to be noted that both described devices are reversible, i.e., rotary motion will produce axial movement.

While in order to comply with the statue, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A rotary actuator comprising a pair of spaced concentric cylinders, means defining a plurality of pairs of opposed substantially identical parallel edged slots in the walls of said cylinders, said slots having both an axial and circumferential extent, a plurality of balls positioned between said cylinders, and a ball entering each slot of an opposed slot pair and bearing solely on the edges of said slots whereby when one of said members is axially moved with respect to the other, relative rotary movement will also occur.

2. A rotary actuator comprising a pair of spaced concentric cylinders, means defining a plurality of pairs of opposed substantially identical parallel edged slots in the walls of said cylinders, said slots having both an axial and circumferential extent, a plurality of balls positioned between said cylinders, a ball entering each slot of an opposed slot pair and bearing solely on the edges of said slots whereby when one of said members is axially moved with respect to the other, relative rotary movement will also occur, and means for axially moving one of said members relative to the other to cause said rotary movement.

3. A rotary actuator comprising a pair of spaced concentric cylinders, means defining a plurality of pairs of opposed substantially identical parallel edged slots in the walls of said cylinders, said slots having both an axial and circumferential extent, a plurality of balls positioned between said cylinders, a ball entering each slot of an opposed slot pair and bearing solely on the edges of said slots whereby when one of said members is axially moved with respect to the other, relative rotary movement will also occur, means for axially moving one of said members to cause said rotary movement and means holding said other member stationary.

4. A rotary actuator comprising a pair of spaced members having concentric cylindrical walls, said cylindrical walls being cut away to provide a plurality of pairs of opposed substantially identical parallel edged slots having both a lengthwise and circumferential direction, and a ball between said cylindrical walls engaging the edges only of both of the slots in each pair, one of said members being stationary, the other of said members being movable with respect to said stationary member both axially and circumferentially as said ball rolls on said edges.

5. A rotary actuator comprising a pair of spaced members having concentric cylindrical walls, said cylindrical walls being cut away to provide a plurality of pairs of opposed substantially identical parallel edged slots having both a lengthwise and circumferential direction, a ball between said cylindrical walls engaging the edges only of both of the slots in each pair, one of said members being stationary, the other of said members being movable with respect to said stationary member both axially and circumferentially as said ball rolls on said edges, and means for axially moving said movable member to cause circumferential rotation thereof.

6. A rotary actuator comprising a pair of spaced members having concentric cylindrical walls, said cylindrical walls being cut away to provide a plurality of pairs of opposed substantially identical parallel edged slots having both a lengthwise and circumferential direction, a ball between said cylindrical walls engaging the edges only of both of the slots in each pair, one of said members being stationary, the other of said members being movable with respect to said stationary member both axially and circumferentially as said ball rolls on said edges, and means for axially moving said movable member to cause circumferential rotation thereof, said latter means including a solenoid winding and a solenoid core bearing on said movable member.

7. The subject matter of claim 1 wherein said cylinder walls are of substantially equal diameter, and have opposed ends, and wherein said slots are sunk in said opposed ends.

8. The subject matter of claim 1 wherein said cylinder walls are disposed one within the other and are annularly spaced from one another and the slots of each opposed slot pair are arranged in radially opposed relation.

References Cited in the file of this patent

UNITED STATES PATENTS

| 2,280,659 | Muller | Apr. 21, 1942 |
| 2,328,501 | Schanzer | Aug. 3, 1943 |
| 2,395,784 | Honegger | Feb. 26, 1946 |
| 2,539,090 | Leland | Jan. 23, 1951 |

FOREIGN PATENTS

| 659,975 | Germany | May 18, 1935 |
| 968,267 | France | Apr. 12, 1950 |